Aug. 5, 1924.
G. GRINDROD
PROCESS OF TREATING MILK AND MILK PRODUCTS
Filed Oct. 16, 1918
1,503,892
*Fig:1.*
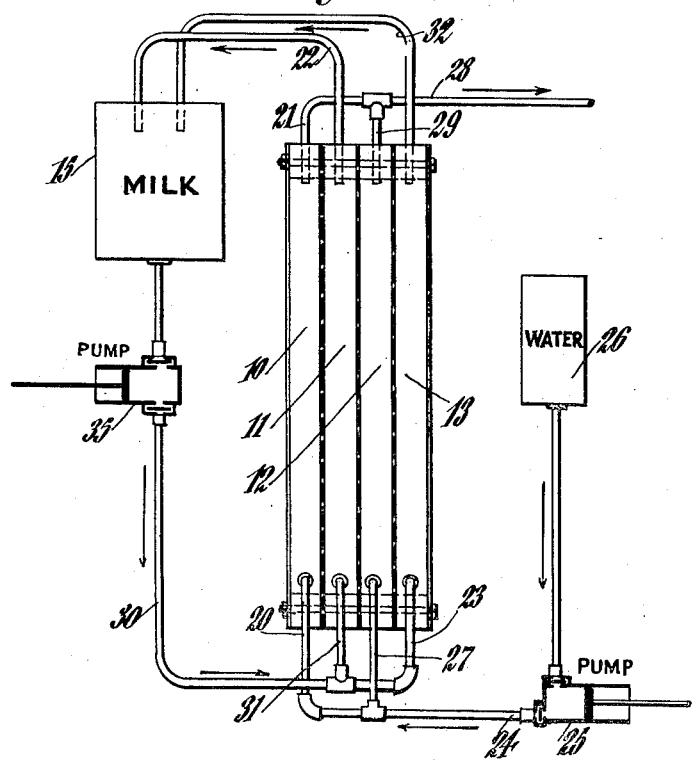
*Fig:2.*
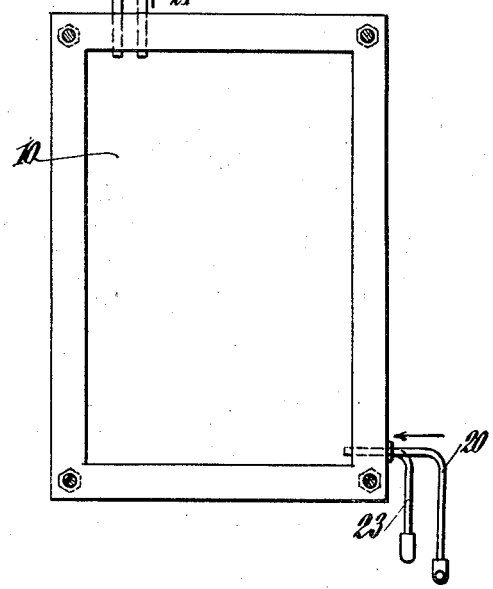
INVENTOR
George Grindrod
BY C. P. Goepel
ATTORNEY Patented Aug. 5, 1924.

1,503,892

UNITED STATES PATENT OFFICE.

GEORGE GRINDROD, OF OCONOMOWOC, WISCONSIN, ASSIGNOR TO CARNATION MILK PRODUCTS COMPANY, OF CHICAGO, ILLINOIS, A CORPORATION OF DELAWARE.

PROCESS OF TREATING MILK AND MILK PRODUCTS.

Application filed October 16, 1918. Serial No. 258,468.

*To all whom it may concern:*

Be it known that I, GEORGE GRINDROD, a citizen of the United States, and resident of the city of Oconomowoc, in the county of Jefferson and State of Wisconsin, have invented certain novel Processes of Treating Milk and Milk Products, as also Certain Novel Milk Products, of which the following is a specification.

This invention relates to milk, and has for its object to provide certain novel processes to be used in the preparation of milk for commercial uses; it has also for its object to provide a new treatment of milk preparatory to its use, either when desired to be used in its substantially original state,—that is, as whole milk,—or when desired to be used in commerce under the name of evaporated milk, or under the name of evaporated milk products.

The invention has further for its object to provide distinct improvements in the manufacture of such evaporated milk products, and certain of the features of the invention to be hereinafter described may be used either separately of each other or conjointly with each other.

The first part of my invention has more particularly for its object to bring about a sterilized milk or milk product, or evaporated milk product, or an evaporated milk compound, in which end product there is no "cooked" flavor, which "cooked" flavor has been heretofore generally inherent in sterilized milks. These features of my invention will first be described herein and on the completion of the same, the second group of features of the invention will be described.

The first features of the invention comprise, as above indicated, the treatment of milk so as to provide a milk free from the "cooked" flavor usually inherent in sterilized milks. When milk, and particularly evaporated or condensed milk, is subjected to the sterilizing heat necessary to sterilize, that is, preserve it, a marked change in flavor has always been found to be produced. This flavor is generally known as a "cooked" taste. Heretofore, and in certain publications, this "cooked" taste has been called a "metallic" flavor, and it has been supposed that it has been due, in part at least, to some metal taken into the milk during the processing of the milk in apparatus or containers. This undesirable flavor is a great factor in preventing the more extended use of canned milk in place of fresh milk, and even in the case of fresh or whole milk sterilized, the presence of the flavor has been found to be objectionable, and to induce the impression that the milk was not of the best. Several endeavors have heretofore been made for the prevention of this flavor, for instance, changes in the heat applied during the sterilizing processes have been made, and various modifications of the sterilizing processes have been tried for minimizing the flavor, but it has been found that the degree of improvement possible by such methods was very limited and uncertain. Moreover, the use of low temperatures and intermittent sterilization which is applicable to other substances is of no use with evaporated or condensed milk, because of the fact that there is a group of resistant spore forming milk bacteria which, unlike others, cannot be killed by this intermittent or low heat method.

Then, as a second method, the use of ultra-violet light for sterilizing has been proposed, but I do not know that this has as yet been found to give any improvement, even if applied strong enough to effect complete sterilization.

As a third proposal, the use of glass containers and glass lined apparatus throughout the processes has been made, but this has been found to have no effect, and as a result of this, I have concluded that the flavor is not metallic in origin.

I have found, as a result of numerous tests, experiments and deliberations, that both fat and lactose of milk are unaffected by sterilizing. Neither has been found to have lost anything through sterilizing or to have undergone any decomposition. Neither the fat nor the sugar extracted from sterilized milk has any of the peculiar "cooked" flavor. The casein and albumin are known to undergo coagulation through sterilization or before, but the "cooked" taste does not increase in accordance with the extent of coagulation, and it is produced even if coagulation does not take place. But if the fat, lactose and coagulated proteins are removed from sterilized milk, the remaining substances, the salts or mineral constituents, soluble proteins and other soluble substances, are found to have the "cooked" taste in them in increased concentration.

I have employed novel and sensitive methods for estimating the extent of protein decomposition taking place during the sterilizing. This decomposition, together with the production of the "cooked" taste, was found to proceed in extent according to the laws of catalysis, that is, the extent of protein decomposition with any given milk varied (1) directly as the concentration of the milk; (2) directly as the time of application of heat; (3) as a function of the temperature.

It is well known that catalysis proceeds in accordance with three definite laws: First, the rate of reaction varies directly as the density or the amount of the catalyst per unit of space. Thus, in the reaction that takes place in its solution, other things being equal the rate of reaction varies directly as the amount of catalyst in solution. Second, another well-defined law of catalysis is that within certain limits of temperature, the rate of reaction proceeds according to some mathematical function of the temperature. Thus, the rate of reaction may not be proportional to the decrease expressed in any temperature scale and the rate of reaction may not be a straight line formula but corresponds to some definite equation, and invaribly increases as the temperature, within such limits as it is possible for the reaction to take place. Third, the extent of reaction when influenced by a catalyst, other things being equal, depends upon the length of time to which the substances are exposed to the catalyst. The formation of cooked taste in the sterilization of milk I have found to follow definitely these basic laws of catalysis. In particular, the first variable, relating to the quantity of the catalyst, is in this case, governed by the amount of certain inorganic salts in solution per unit of volume.

Furthermore, the extent of protein decomposition and "cooked" taste produced was found to vary directly as the quantity present of non-colloidal compounds, other that lactose present in the milk serum. This property of the crystalloids was further investigated in two ways; first, the inorganic salts of milk were prepared in pure state and without decomposition or change. These purified inorganic salts without milk were then added in varying amounts to evaporated milks of known composition, and the samples sterilized. The cooked taste was found to vary directly as the total amount of such inorganic constitutents present. Secondly, inorganic constituents were removed from milk of known composition in certain definite proportions, and the rate of development of cooked taste in the samples was noted. The development of cooked taste was found to be decreased in proportion to the inorganic salts removed. The removal was effected by dialysis. Third, the serum of milk was prepared and freed from proteins and lactose. The remaining portion consisting of inorganic salts was then fractionated by dialysis and the constituent fractions added to normal milk and the same was then sterilized. These experiments showed several, and possibly, all of the inorganic constituents, to influence the proteins, but the larger part of the effect could be attributed to the citrates present in the milk. The salts other than the citrates and of similar molecular weight exerted an appreciable, but lesser effect. From the above I determined that the cooked taste developed in milk by sterilization was brought about through the intermediary action of certain of the crystalloids other than lactose, and determined that the percentage of such free crystalloids could be reduced by dialyzing to a point where their intermediary action on the proteins became negligible. This indicated that the "cooked" taste of milk was not due to the direct action of heat on proteins or other constituents, but to the intermediary action of those compounds of small molecular weight, chiefly due to the action of the inorganic salts on the protein constituents of the milk. This decomposition of protein with the formation of the "cooked" taste was found to be carried on slowly at ordinary temperatures, but to be hastened as the temperature was higher. It was found to proceed at ordinary temperatures at an increased rate, when the percentage of non-collodial other than lactose constituents was increased by addition of them to the milk. No single one of these crystalloids-other-than-sugar was found to be solely responsible for the decomposition of proteins with consequent formation of "cooked" taste, but the flavor was apparently produced by their combined or several actions. I have found that the constituents-other-than-lactose of the milk serum were largely responsible for the production of the "cooked" taste, or are responsible for the inability of milk to withstand sterilizing heat without production of a "cooked" taste. In view of this discovery, I propose to remove these undesirable compounds from the milk before sterilizing, and it is clear that if removed, then the milk with such undesirable compounds removed, would then withstand sterilizing heat without production of "cooked" taste. In order to remove these undesirable compounds, I propose to avail myself of the law that the crystalloids present in milk possess a much smaller molecular weight than any other constituents of the milk, and hence they have a greater osmotic pressure and mobility. Therefore, I propose, and have discovered that such crystalloids can be removed by partial dialysis, and in this I use any suitable semi-permeable membrane as a dialysing medium. On applying partial dialysis to the milk, or subjecting the milk to partial dialysis either before or after any evaporation or condensation of the milk, but before sterilizing I have found the milk so treated will withstand sterilizing without the production of any "cooked" taste or with only a negligible "cooked" taste.

I have carried out tests to confirm my observations, and I have found that upon dialyzing a quantity of milk for such a length of time that if the ash contained was reduced by one-tenth of its original quantity, the milk withstood the usual sterilizing processes with only a slight production of "cooked" taste, being decidedly improved over what it was when given the same sterilization without the dielysis preceding sterilization. Further tests, in which the ash content was still further reduced, have further borne out my observations.

In regard to the dialysis process in general, it may be said that when a soluble substance is put into solution in a liquid, the molecules of the substance are freed of their attraction for each other and separate from each other under a great repulsion. If the solute is inclosed in a container, a cell made of a membrane which is permeable to the molecules of the solvent (water) but not to the larger molecules of the substance (solute), the solute will cause water to be drawn in through the pores of the membrane until a pressure is reached equalizing the pressure of the repulsion of the molecules of the solute. The molecules of the solute are thus placed under a great pressure tending to drive them out through the pores. This pressure or force is known as osmosis, and follows well known natural laws. If a crystalloid, such, for example, as common salt is placed in solution in water in a semi-permeable cell and this cell placed in pure water, the cell having pores larger than common salt molecules so as to just permit the molecules of the crystalloid to pass, the crystalloid or salt molecules will, under great pressure, be driven through the pores and out into the pure water. If the salt was mixed in the cell with some substance having larger molecules, or mixed with a colloid, the large molecules, or the colloid, would be unable to get through the membrane pores, and so could be separated partly or completely from the salt of small molecular size. Also the substance of large molecular weight, or the colloid, would not exert so great a pressure in trying to go through the membrane, since the osmotic pressure of large molecules is smaller than small molecules, and the osmotic pressure of colloids is very small, being generally too small to measure. A separation of substances of different molecular weight or size by means of a semi-permeable membranous cell immersed in pure or nearly pure water, utilizing the great osmotic pressure of the substance of smaller molecular weight is known as dialysis. I have found this method to be particularly applicable to separating inorganic salts from colloids such as proteins, as I have above pointed out to be part of my invention.

In order to make dialysis applicable for dialyzing large quantities of milk, the simple sack or cell, as just referred to, is modified in either one of two general ways: (1) A series of cells separated by semi-permeable membranes is built up by placing upon a frame or ring, a sheet of the membrane, and on this another frame or ring is placed, and upon this second ring or frame a second sheet of the membrane is arranged, and upon this second ring or frame a third ring or frame and membrane, and so on until a plurality of rings or frames with membranes is provided. The rings or frames may be of any convenient size, but must have the faces which come in contact with each other and with the sheets of membrane so ground or machined that they make tight contact. Rings or frames of rectangular cross section, in view of the simplicity of manufacture, are thus preferable. In this way any desired number of flat cells may be built up, the finished apparatus resembling an ordinary filter press in general make-up. Each ring has an inlet and an outlet tube. The inlet tube of each alternate cell, such as numbers 1, 3, 5, 7 etc., is connected to a feed pipe from a reservoir of milk under slight pressure. The milk may be pumped to these cells. The other alternate cells, such as numbers 2, 4, 6, 8 etc., are connected to a supply of pure water, either distilled or fairly pure natural water. This water may be pumped to these cells. The water and milk are caused thus to flow through alternate cells separated only by a membrane which is permeable to water and other molecules up to the size of lactose molecules. The milk is circulated through these cells continuously, and the water is caused to flow through these cells at such a rate as to keep a low concentration of the salts washed out of the milk. The rate of dialysis depends primarily on the ratio of membrane surface to the bulk of milk to be dialyzed, and, the length of time required to put a given quantity of milk through the process may be reduced to any practical length.

In considering my invention, it must be remembered that the molecular weight of salts is comparatively small, and that the molecules are mostly smaller than lactose molecules except for calcium citrate, which is about 498.41. It will also be remembered that cow's milk has about twice as much salt as human milk, and, hence, the salt contents of cow's milk is usually excessive. For this reason milk treated in accordance with my invention has its mineral salt contents reduced or removed, but is not at all injuriously influenced, but, on the contrary, is beneficially influenced when considered in connection with the salt contents of human milk.

In the accompanying drawings, I have shown an embodiment of this form, in which embodiment Fig. 1 shows an end view of the dialyzing apparatus and the milk reservoir and piping in diagrammatic form; and Fig. 2 shows a front view of one of the rings or frames with the membrane supported thereby. In these drawings, the cells are indicated by 10, 11, 12 and 13, 10 and 12 being the water cells and 11 and 13 being the milk cells. In Fig. 2, I have shown a side view of one of the cells, for instance, 10, and it has its inlet pipe 20 for the water, and its outlet pipe 21 for the water. At the same time, Fig. 2 shows a side view of the other pipes, for instance, outlet pipe 22 for the milk and the inlet pipe 23 for the milk. The inlet pipe 20 for the water is fed from a main pipe 24, which is connected with a pump 25, which pump is supplied by the water reservoir 26, and it has other branch pipes. Connected with the main pipe 24 are other branch pipes, as, for instance, 27. The outlet main pipe 28 is connected with the branch pipe 21 before referred to, and with other branch pipes, as, for instance 29. The main pipe 30 is connected with the branch pipe 23, and has other branch pipes 31, and the outlet pipe 22 for the milk passes into the reservoir 15 for the milk, as also other outlet pipes, as, for instance, 32, pass from the cell 13 to the milk reservoir 15. Between the milk reservoir and the main pipe 30 is arranged a pump 35, which serves to pump the milk through the milk cells.

Another modification of the apparatus, which is also suitable for large scale work, is to make the membrane in the form of a tube. This tube is then immersed in pure or practically pure running water, and the milk pumped or circulated continuously through the tube, or, the tube may be immersed in the milk and water circulated through the tube until the desired amount of crystalloids is washed out, after having passed from the milk through the membrane into the water. The membrane used must have permeability within certain limits.

If such a membrance as $CuFe(Cn)6$, as is commonly used for dialysis, be employed, the pores will be too small, and although a total of one-tenth of the ash may be removed, the effect on the milk will be incomplete, because certain crystalloids of larger molecular weight are not removed. If the pores are larger than lactose molecules, a large loss of lactose will take place. It is, therefore, necessary to prepare membranes having uniform porosity, and as near as possible to the size of lactose molecules without permitting appreciable loss of lactose, and preferably preventing lactose molecules to pass. Membranes of suitable porosity may be prepared from amyloid (parchment paper completely gelatinized) nitro-cellulose, actyl cellulose and similar gelatinous membranes.

In the application of this process to milk in large quantities I have found best results to be obtained from amyloid membranes. These membranes will develop a certain porosity which is easier to control than any other membranes so far examined. The amyloid membranes developed for this purpose are distinct from ordinary parchment paper as heretofore used, in the following respects: A very heavy fine-fibre paper composed of the purest cellulose only is used as a material from which the membranes are to be made. This paper is then immersed in sulphuric acid of approximately 80% $H_2SO_4$ at a temperature of 15° C., in a vessel having a flat smooth bottom. The paper is forced to the bottom of the dish and completely covered on both sides with the acid. The acid is then allowed to act on this paper until it is completely gelatinized and translucent. This is different from ordinary parchment paper in that the latter is usually gelatinized on one side only, and is then incompletely gelatinized, whereas this dialyzing medium is cellulose completely transformed into amyloid and so completely gelatinized that it has no pores other than those due to its own colloidal nature. The size of the pores decreases according to the length of time the acid is allowed to act, and in this manner any desired size of pore may be produced. In order to transfer such completely gelatinized membranes from the acid it is necessary to press the membrane onto the bottom of the dish or vessel and then remove the acid. The action continues after the bulk of the acid is removed and is stopped instantaneously at the point desired by immersing the membrane in cold water which precipitates the colloid from the acid solution. In this manner it has been possible to very carefully regulate the pore size in this colloidal membrane so that it is practically impermeable to lactose but permeable to calcium citrate. It should be noted in this connection that the molecule of calcium citrate is heavier than the molecule of lactose in the ratio of 498 for calcium citrate to 348 for lactose, but the calcium citrate molecule on going into solution in water is ionized and in the dilution present is completely ionized into its constituent ions, consisting of three calcium ions and two citrate ions, each molecule of calcium citrate being therefore divided into five parts in solution, and in this condition they are much smaller than the lactose molecules which are not ionized and therefore the former will easily pass through membranes which are impervious to lactose.

As practical examples of various experiments conducted to determine the effect of dialysis, the following are submitted: Experiment using copper ferrocyanide precipitated in completely gelatinized parchment paper. A quantity of milk condensed to an ash content of 1.122%, lactose content of 9.5% and a fat content of 8.57% was dialyzed over a parchment membrane containing copper ferrocyanide. 1310 grams of milk were dialyzed for 17½ hours. After dialysis, the ash content was reduced to 1.034% or a decrease in ash content of .088%, the result being calculated on the basis of the original milk. This milk on being sterilized was found to be the same as the original in so far as production of cooked taste and color was concerned—that is—the dialysis had not accomplished anything toward removal or prevention of the flavor.

Experiment No. 2: 2510 grams of milk having an ash content of 1.200% was dialyzed for four hours on a completely gelatinized parchment membrane at the end of which time the ash content was reduced to .108%. This milk on being sterilized showed no production of cooked taste and very little darkening in color, while a sample of the original milk sterilized at the same time under the same conditions showed development of the usual cooked taste and dark color. This indicated that the upper ferrocyanide membrane had not permitted the passage of the inorganic salts responsible for the cooked taste, but that the more porous amyloid membranes permitted the passage of the salts at a rate several times faster and a practical removal of the agents responsible for the cooked taste.

The fact that an amyloid membrane permeated with copper ferrocyanide and thus having much smaller pores than amyloid alone, permitted the passage of nearly 10% of salts from the milk and yet did not produce any general effect on the milk, indicates that the salts of small molecular weight are not the ones chiefly concerned in the production of color, flavor or coagulation. This verifies experimental work conducted by adding to milk purified salts wherein it was found that the chlorides of sodium and potassium which are the smallest ions of salts existing in the milk have no effect on color or flavor. It is evident that such salts would pass readily through a copper ferrocyanide membrane and they are the salts chiefly removed by a copper ferrocyanide membrane. The fact that a less dense membrane such as amyloid is necessary in order to secure removal of the constituents responsible for the cooked taste is evidence that the large ions such as the citrate ions have to be removed in order to prevent the cooked taste. This is also confirmed by the experimental work wherein the purified salts were added to the milk.

From the above, it will be seen that I have discovered the cause of the decomposition of proteins in milk, by heat, and that such discovery involved the recognition of the injurious presence of the crystalloids during the sterilizing process, as heretofore carried out, and that I have also discovered the chemical laws governing the production of the "cooked" flavor.

In order to provide a sterilized milk free from, or substantially free from, "cooked" taste, I remove a part of the crystalloids or salts or mineral constituents, or the constituents producing protein decomposition from the milk, and one form of such removal would be by partial dialysis. The milk having these protein decomposition constituents removed,—that is, a milk having a reduced proportion of non-colloidal compounds other than lactose present in the milk serum, or a reduced proportion of non-colloidal lactose free constituents,—may then be sterilized under the usual sterilizing heats and the resultant product will be free from "cooked" taste, or will have the "cooked" taste reduced and the flavor improved.

It is, therefore, clear that this process may be employed in the uses of all treatments of milk which require sterilization, and a sterilized milk product may be produced free from or reduced to negligible quantity of "cooked" taste.

If it is desired to apply my invention in the uses of milk during the evaporation or condensation processes of evaporated or condensed milk or evaporated compounds of skimmed milk and a substituted fat, or infants' milk and suitable preserved, or other milk uses, the milk may be treated in accordance with my invention, either before or after the evaporation stage of the process, but, of course, it must be before sterilization.

My invention also finds application to such milk as is used in modified, certified, and pasteurized milks; in milk powders; in evaporated, sweetened, condensed, and congealed milk; in malted milk; or in all such other instances where sterilization takes place.

I have also found that my invention, or the method I propose, improves the stability and general keeping qualities of sterilized whole milk, and also improves keeping qualities of sterilized whole milk which is to be kept in hot climates.

Having thus described my invention, I claim as new, and desire to secure by Letters Patent:

1. The process of making evaporated milk which consists in removing from milk before sterilization part of the crystalloid mineral constituents, evaporating the water contents to the desired degree either before or after such removal, and then sterilizing the evaporated milk free from such removed constituents.

2. The process of making evaporated milk, which consists in subjecting milk to partial dialysis, said dialysis employing membranes of pores of a size slightly less than the lactose molecules of the milk, evaporating the water contents of the milk either before or after the dialyzing of the milk, and sterilizing the evaporated dialyzed milk.

3. The process of making evaporated compounds of skimmed milk and a substituted fat, which consists in removing from skimmed milk the crystalloid mineral constituents, evaporating the water contents to the desired degree either before or after such removal, adding the substitute fat, and then sterilizing the evaporated milk product free from said removed constituents.

In testimony that he claims the foregoing as his invention, he has signed his name hereunder.

GEORGE GRINDROD.

Witnesses:
F. L. CLARKE,
C. P. GOEPFL.